BASIC CIRCUIT

OSCILLATOR

CONVERTER

INVENTOR
David M. Makow
BY W. R. Meredith
ATTORNEY

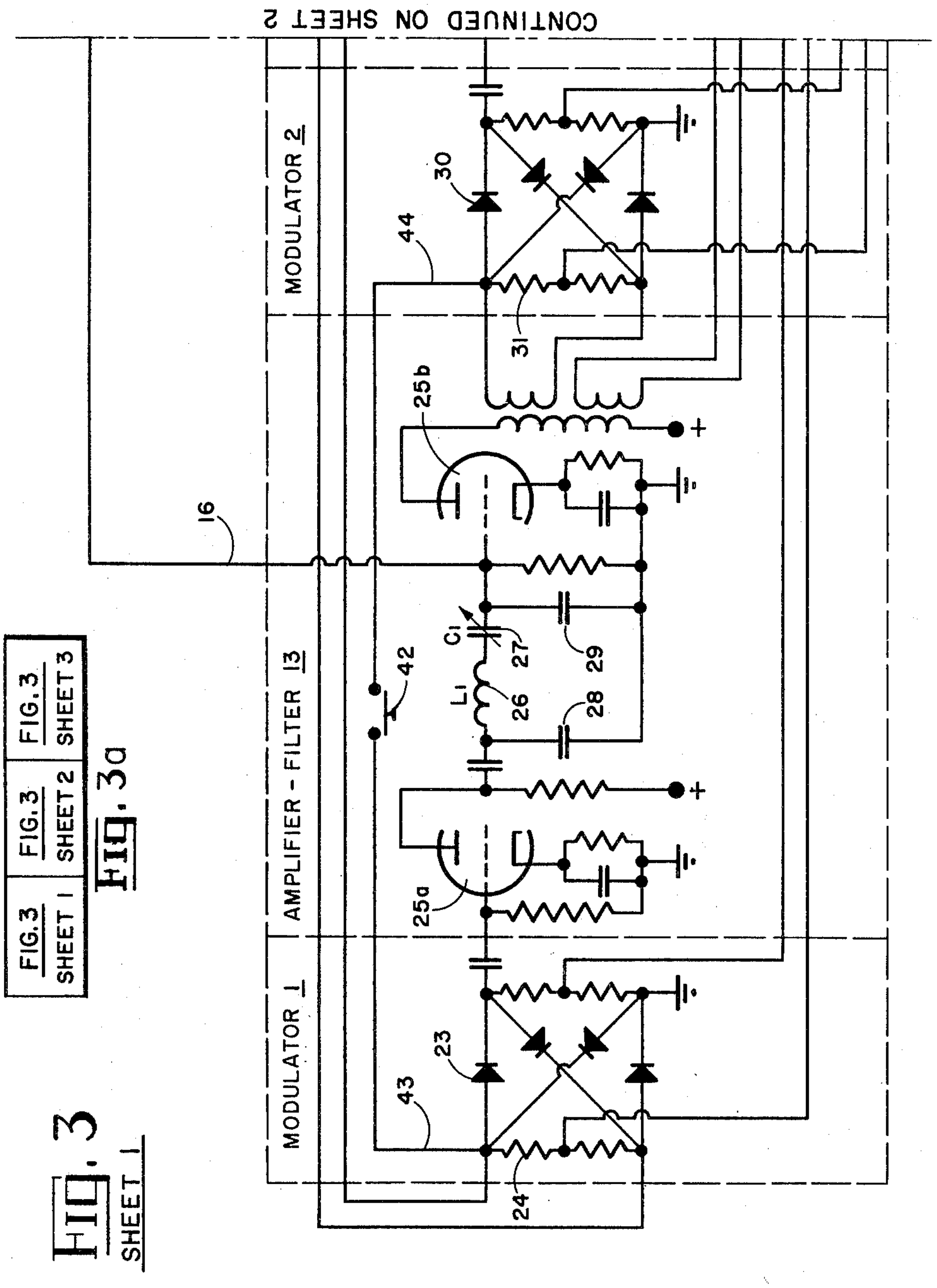
FIG. 3 SHEET 1, FIG. 3a
INVENTOR
David M. Makow
BY W. R. Meredith
ATTORNEY

SHEET 2

INVENTOR
David M. Makow
BY W. R. Meredith
ATTORNEY

Dec. 4, 1956 D. M. MAKOW 2,773,179

ELECTRONIC CIRCUITS FOR GENERATION OF OSCILLATION, FREQUENCY CONVERSION, AND OTHER FUNCTIONS

Filed June 6, 1955 8 Sheets-Sheet 4

FIG. 3 SHEET 3

INVENTOR
David M. Makow
BY W. R. Meredith
ATTORNEY

INVENTOR
David M. Makow
BY W. R. Meredith
ATTORNEY

INVENTOR
David M. Makow
BY W. R. Meredith
ATTORNEY

INVENTOR
David M. Makow
BY W. R. Meredith
ATTORNEY

INVENTOR
David M. Makow
BY W. R. Meredith
ATTORNEY

United States Patent Office 2,773,179

Patented Dec. 4, 1956

2,773,179

ELECTRONIC CIRCUITS FOR GENERATION OF OSCILLATION, FREQUENCY CONVERSION, AND OTHER FUNCTIONS

David M. Makow, Ottawa, Ontario, Canada

Application June 6, 1955, Serial No. 513,371

5 Claims. (Cl. 250—20)

This invention relates to a device capable of adaptation as an oscillator having improved frequency stability, as a superheterodyne conversion system of improved intermediate frequency stability in which no local oscillator is used, and to a number of types of circuits suitable as frequency converters for use in radio link systems, frequency multipliers and dividers, special filters and amplitude discriminating devices.

A particularly attractive and interesting use of the present invention is in relation to an oscillator of improved frequency stability. Prior art oscillators are characterized by a single regenerating feed back loop. The frequency stability of prior art oscillators is, in general, dependent on the stability of the resonator and is influenced by changes in the energy-supplying part of the circuit. In the present invention, due to the special multi-loop feed back arrangement, the influence of the above-mentioned causes of frequency instability can be almost totally eliminated.

In the prior art superheterodyne conversion systems, the intermediate frequency was susceptable of direct influence by variations in the input frequency as well as by the local oscillator frequency. In the present systems, cancellation of such variations is substantially achieved, and a separate local oscillator eliminated.

Advantage can be taken of a number of characteristics of the circuit to adapt the invention to frequency multipliers and dividers, special filters, amplitude discriminating devices and other devices which will be apparent to one skilled in the art.

Certain objects of the present invention will be apparent from the foregoing, and in general, the objects of the present invention are as follows:

1. To provide improved oscillation generation;
2. To provide improved frequency conversion;
3. To provide frequency division with high division ratios in a single step, and at high output level;
4. To provide frequency multiplication with high multiplication ratio in a single step and at high output levels;
5. To provide amplitude discrimination; and,
6. To provide special band-pass filtering properties.

Other objects will be apparent from the above and from an examination of the entire specification and the accompanying drawings.

To generalize the systems described herein, all of the embodiments of the present invention make use of three modulators, identified in the accompanying drawings as modulators 1, 2 and 3. Each of modulators 1, 2 and 3 has two inputs, that is a carrier input and a signal input as well as an output. In the embodiments of the invention, the output of modulator 1 is applied to one input of modulator 2, and is also applied to one input of modulator 3. The output of modulator 2 is applied to the other input of modulator 3 and may be connected to one input of modulator 1, and the output of modulator 3 is applied back to the other input of modulator 1 and to the other input of modulator 2.

When the word "applied" is used in the above, it includes both a direct application, or through intermediate circuitry.

The multi-loop system just described is the basic circuit configuration, but in practical embodiments of the invention and as applied to particular uses, additional elements will normally be used such as amplifiers and filters, and additional connections may be made.

The invention will now be described with the assistance of the accompanying drawings wherein preferred embodiments are shown. It will be appreciated that various changes may be made and apparently different embodiments constructed without departing from the spirit of the invention as defined in the appended claims. Accordingly, the description herein and the accompanying drawings are by way of example and not by way of limitation.

In the accompanying drawings wherein like parts are denoted by identical reference numerals in all figures, Figure 1 shows in block diagram form the basic elements and connections of an embodiment of the invention which may be used either as an oscillator or as a frequency converter;

Figure 2:
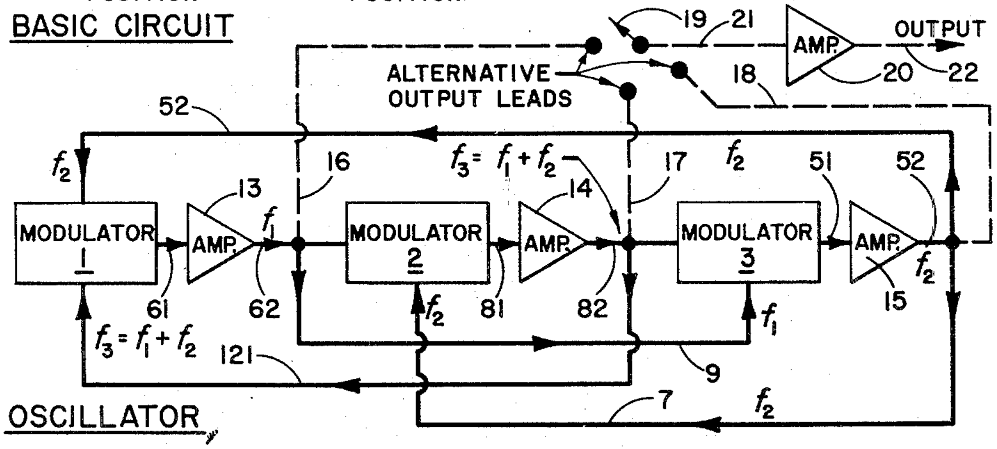
Figure 2 shows in block diagram form an embodiment of the invention as applied to an oscillator of improved stability.
Figure 4:
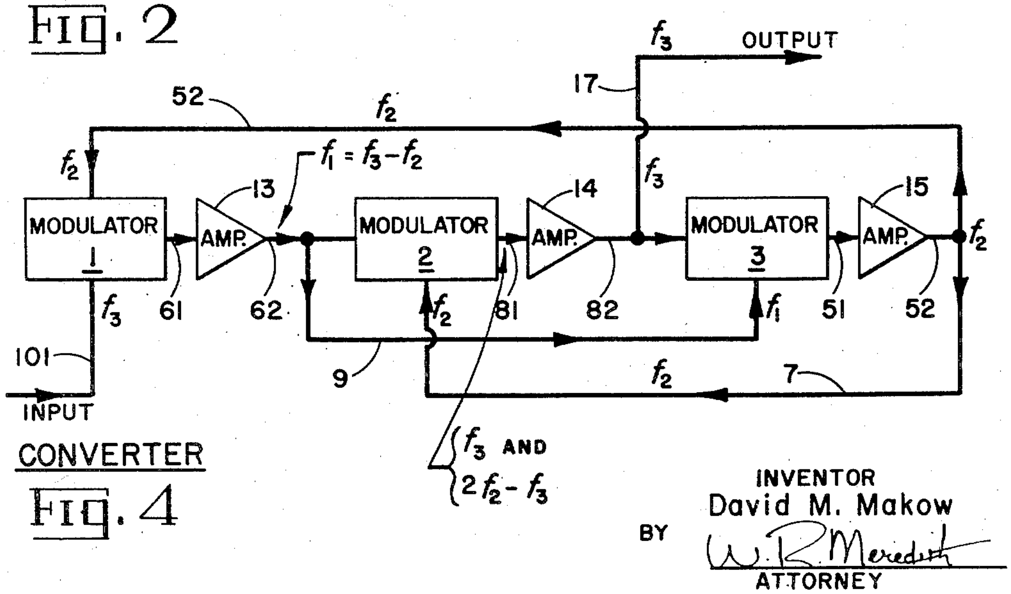
Figure 3:
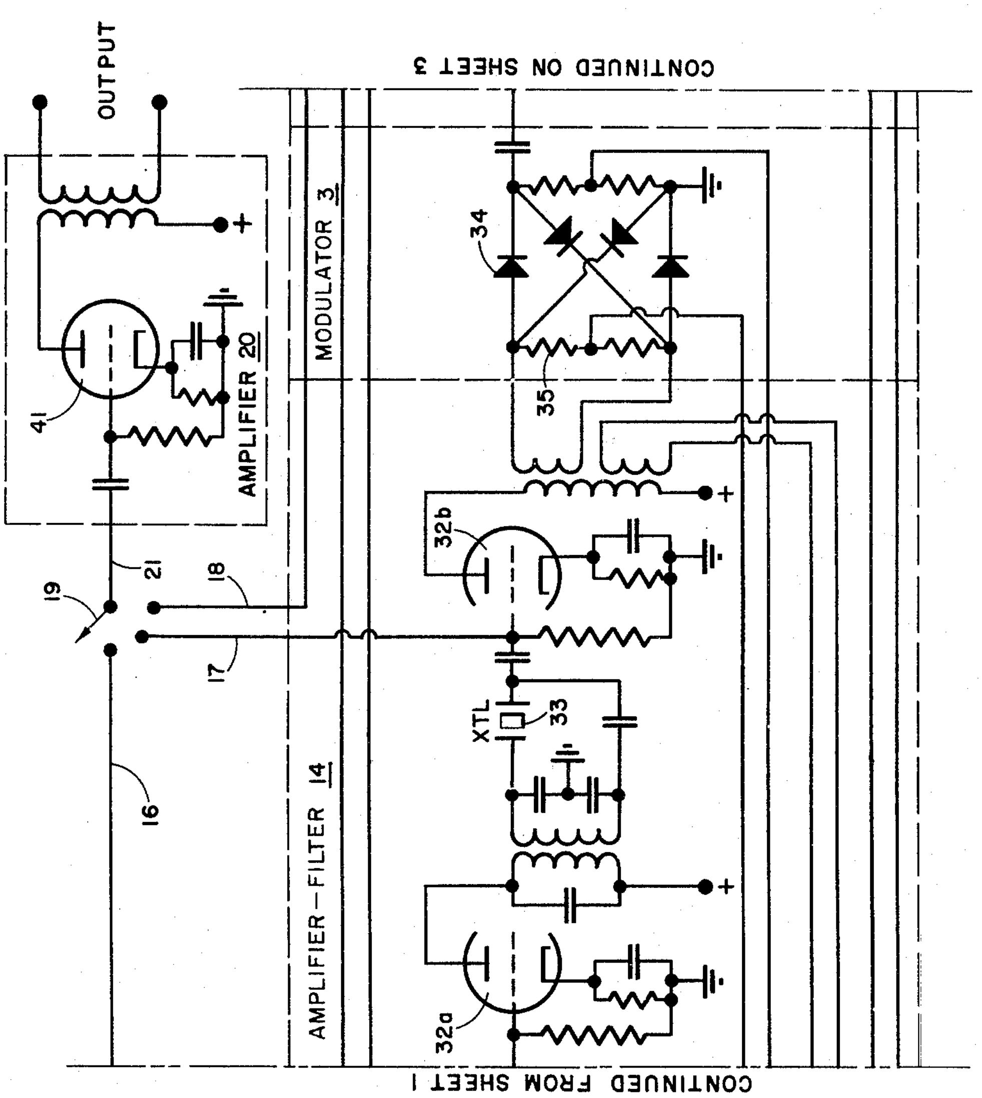
Figure 3 illustrates the embodiment of Figure 2 in greater detail, showing a circuit diagram of the oscillator.
Figure 4:
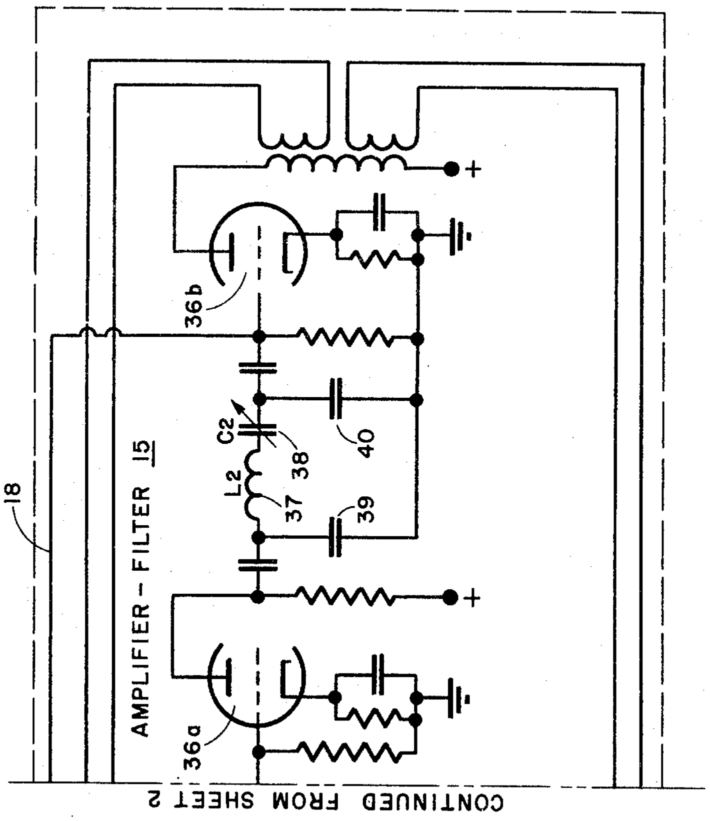
Figure 5:
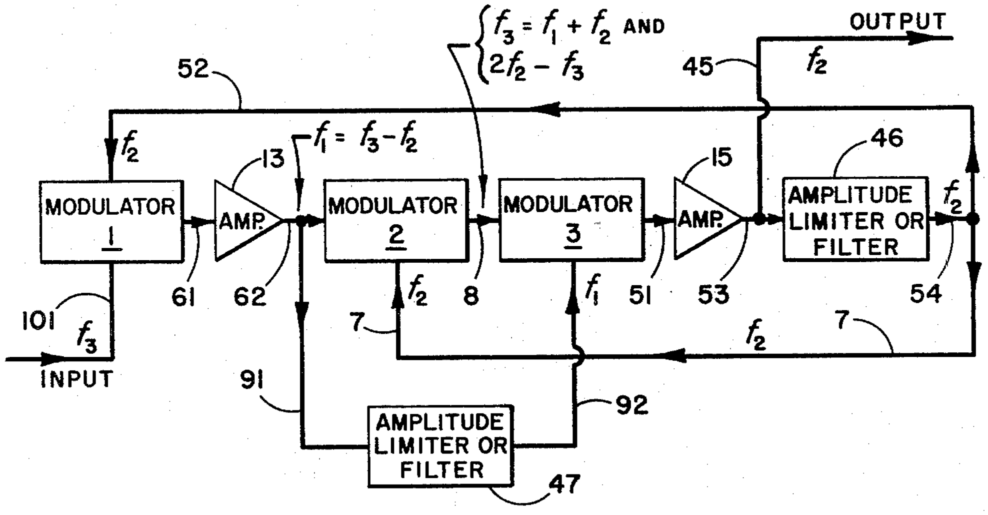
Figure 6:
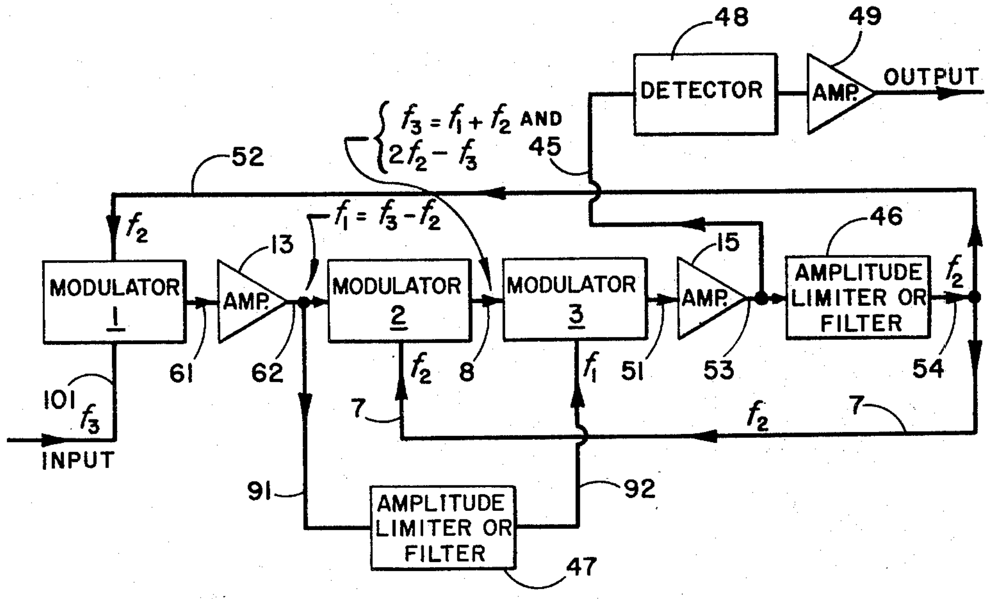
Figure 7:
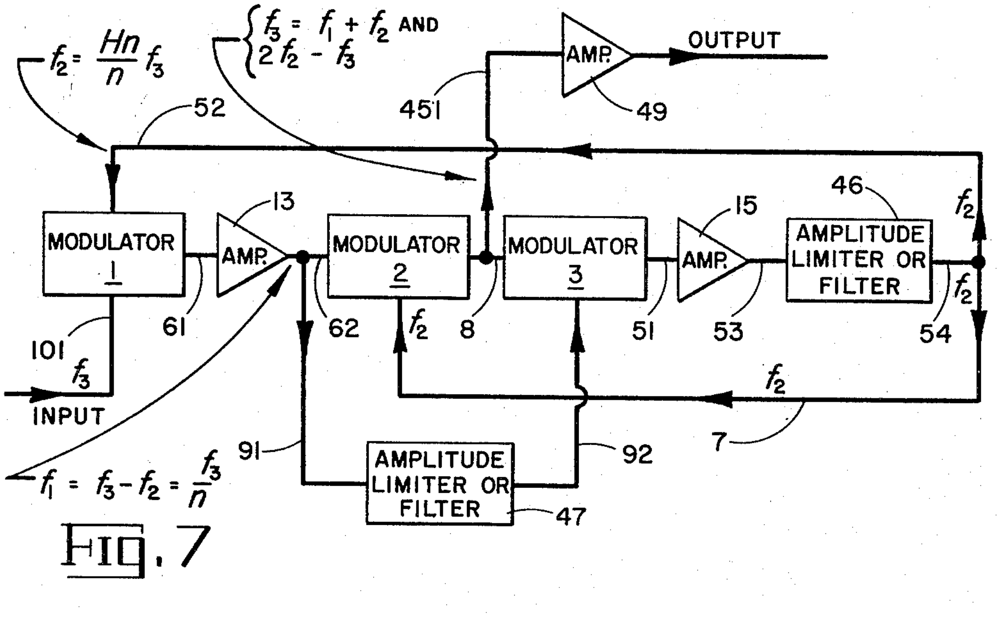
Figure 8:
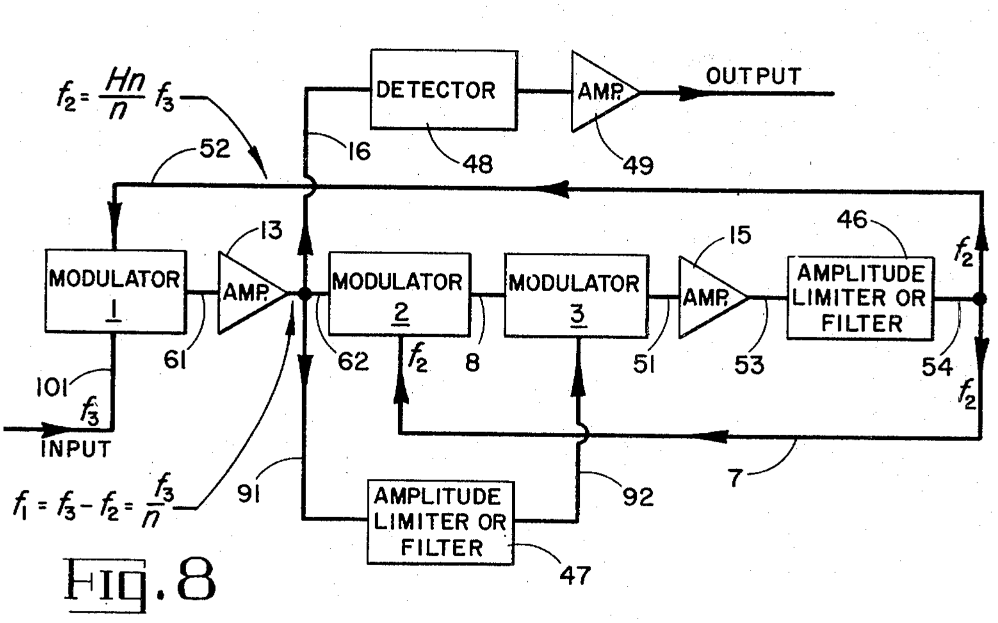
Figure 9:
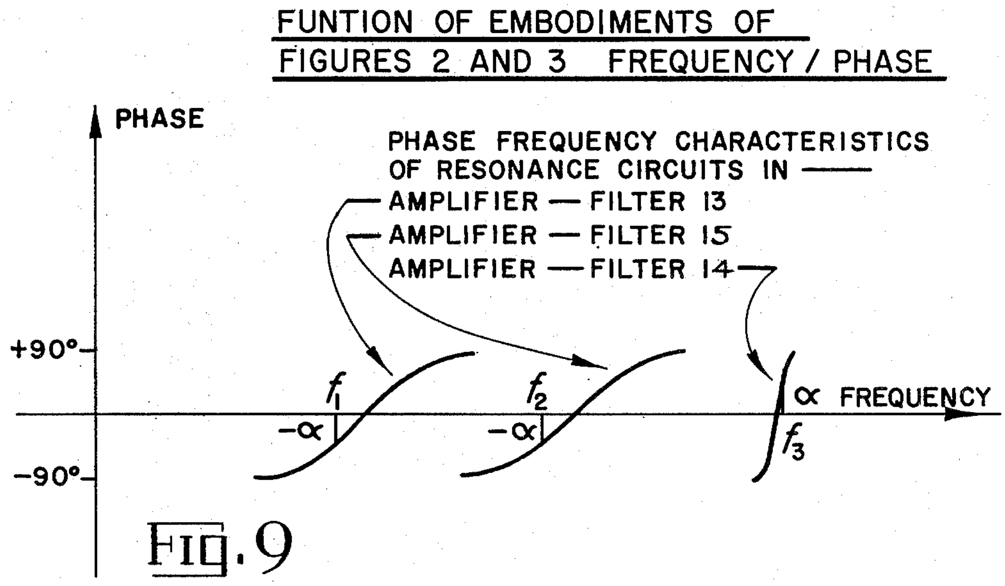
Figure 10:
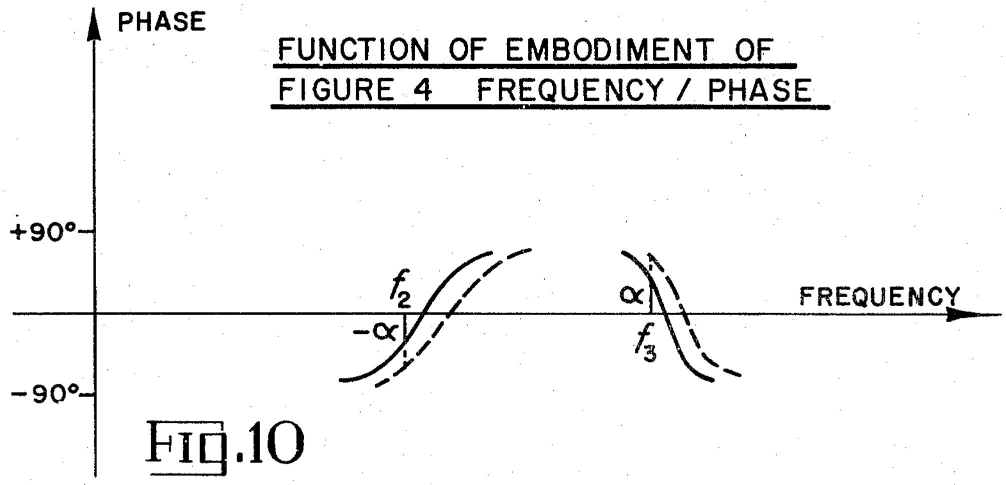
Figure 11:
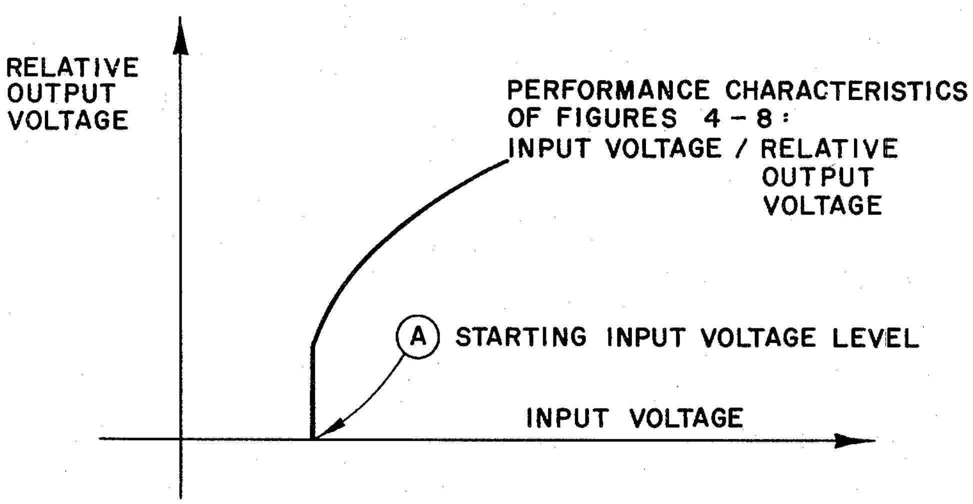
Figure 12:
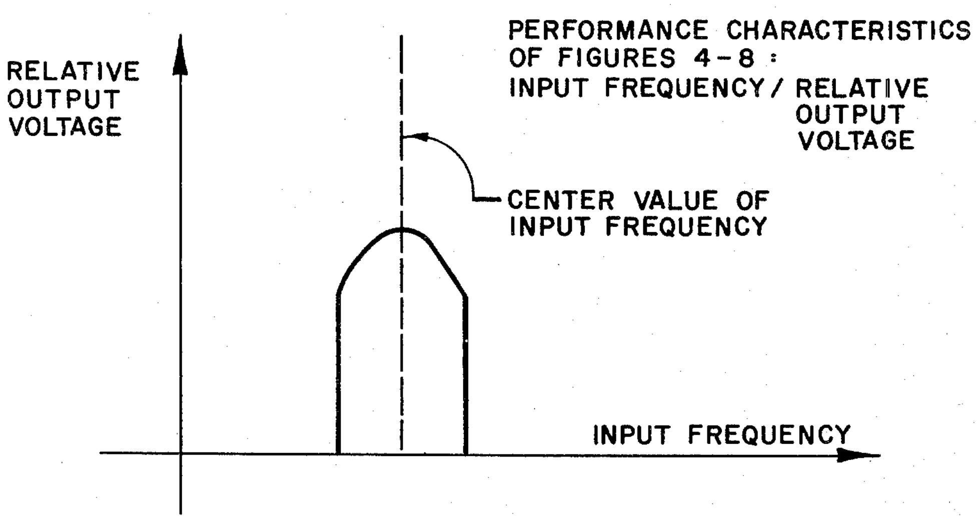

Figure 3*a* is a key diagram showing how the sheets of Figure 3 are viewed together;

Figure 4 shows in block diagram form an embodiment of the present invention as applied to superheterodyne conversion without the use of a local oscillator, where improved intermediate-frequency stability may be achieved;

Figure 5 shows in block diagram form an embodiment of the present invention as applied to superheterodyne conversion without the use of a local oscillator, where the output frequency does not reproduce variations of the input frequency;

Figure 6 shows a modified form of the device illustrated in Figure 5;

Figure 7 shows an embodiment of the invention as applied to a special type of converter, used for example as a radio link;

Figure 8 shows a modified form of the device illustrated in Figure 7;

Figure 9 is a graph indicating the function of the embodiment shown in Figures 2 and 3;

Figure 10 is a graph indicating the function of the embodiment shown in Figure 4; and, Figures 11 and 12 are graphs showing the function of the embodiments illustrated in Figures 4, 5, 6, 7 and 8.

Figure 1:
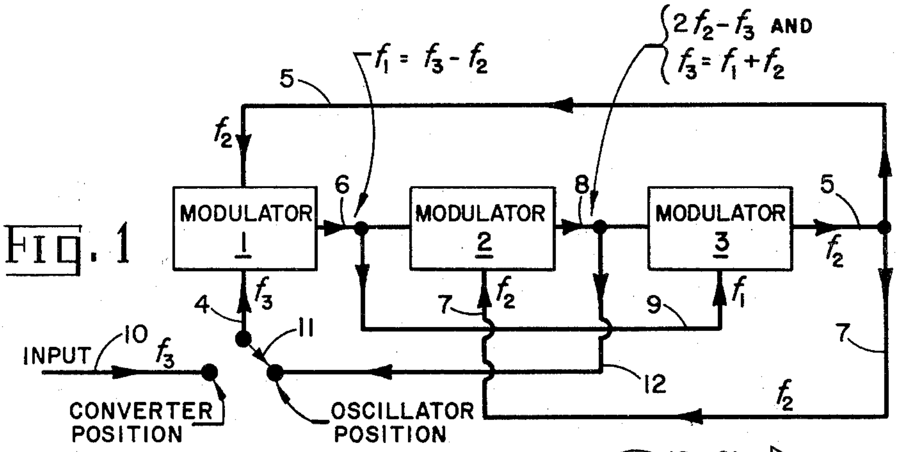

Referring first to Figure 1 where three modulators are shown suitably interconnected, it is seen that among other adaptations, two systems are possible with substantially the same basic circuit configurations, one for generation of oscillation and the other for frequency conversion.

In Figure 1 the three interconnected modulators are shown at 1, 2 and 3. One input of modulator 1 is on the line denoted by 4, and the other input and the output are on the lines denoted by 5 and 6, respectively.

Modulator 2 has one input on line 6 and its other input and its output on lines denoted by 7 and 8 respectively, the one input of modulator 3 being also on line 8. The other input of modulator 3 is on the line denoted by 9, which is connected back to line 6, and the output of modulator 3 is on line 5, leading back to the one input of modulator 1. Line 7 already referred to connects with line 5.

An external input denoted by 10 may be connected to an input of modulator 1 over line 4; alternatively a line denoted by 12 connected to line 8 may also be connected to the same input of modulator 1 over line 4. To indicate the alternative connection, a two-pole switch is shown at 11.

It will be appreciated that a circuit will not normally be required to function alternatively as a converter and as an oscillator, but to demonstrate the similarity of the circuit for each function, convertibility is shown.

The first basic configuration exists when line 12 is connected to line 4 by switch 11, the system will act as an oscillator having special properties which will be discussed below. It will be assumed that a frequency $f_3$ is applied to modulator 1 on line 4 and that a frequency $f_2$ is applied to modulator 1 on line 5. These two input frequencies will produce in modulator 1 an output, among others, of a difference frequency $$f_1=f_3-f_2 \quad (1)$$

This frequency is applied to the modulators 2 and 3 on the lines 6 and 9 respectively. The frequency $f_2$ is also applied on line 7 to the second input of modulator 2 which produces in the output of modulator 1, among others, the sum of $$(f_1=f_3-f_2)+f_2=f_3 \quad (2)$$

The frequency $f_3$ is applied on line 8 to the modulator 3 and also is fed back on line 12 to modulator 1, switch 11 being properly disposed for this connection. There is in the output of modulator 3, among others, the difference of $$(f_3=f_1+f_2)-f_1=f_2 \quad (3)$$

The frequency $f_2$ is fed back to the modulators 1 and 2 on lines 5 and 7, respectively.

The second basic configuration of the circuit exists when switch 11 is so disposed that line 12 is disconnected from line 4 and line 10 connected to line 4. The frequencies $f_1$ and $f_2$ then generated in the system are controlled to a certain extent by the input frequency $f_3$ applied on line 10 to the input of modulator 1. The output of this system can be taken at a suitable point on any of the lines of the system. The system will then act as a frequency converter having special properties which will be discussed later.

Referring to Figure 2 the oscillator embodiment of the invention discussed with reference to Figure 1 will be dealt with in greater detail and the improved stability of the oscillator will be explained. The modulators 1, 2 and 3 are again shown and amplifier-filter combinations denoted by 13, 14 and 15 are connected to modulators 1, 2 and 3. Amplifier-filter combinations 13, 14 and 15 supply sufficient gain and provide frequency-determining circuit elements.

In the embodiment of Figure 2, the lines corresponding to line 6 of Figure 1 are now denoted by 61 and 62, and in a similar way lines 81 and 82 correspond to line 8 and lines 51 and 52 correspond to line 5. The switch 11 is not provided in Figure 2, and line denoted by 121 now provides a direct connection between line 82 (between modulators 2 and 3) and modulator 1.

The output can be taken at different points in the system, alternative output leads being shown in dotted lines at 16, 17 and 18. A switch denoted by 19 selects the output line and applies the output to an amplifier denoted by 20 over a line denoted by 21. The ultimate output is shown at 22.

It will be recognized that the system consists of three loops. The first is formed by lines 61, 62, 81, 82 and 121, and this loop has associated therewith frequencies $f_1$ and $f_3$. The second loop is formed by lines 81, 82, 51, 52 and 7 and has associated therewith frequencies $f_2$ and $f_1$. The condition for the maintaining of oscillations, in addition to the usual conditions that the gain in each loop is greater than unity, and the total phase shift in each loop introduced to the corresponding frequencies is zero, is that the value of these frequencies must be such that $$f_3=f_1+f_2 \quad (1)$$

transposed at all times. These two last conditions determine the value of the frequencies $f_1$, $f_2$ and $f_3$ which will be maintained. With the assistance of the graphs in Figure 9, it will be seen that under certain circumstances the stability of $f_1$ and $f_2$ can be greatly improved.

In Figure 9 the phase frequency characteristics of the resonance circuits in amplifier-filter combinations 13, 14 and 15, respectively, are shown. It is assumed that amplifier-filter combination 14 contains a crystal filter and therefore its phase-frequency characteristic is very steep; amplifier-filter combinations 13 and 15 contain ordinary inductance-capacitance resonant circuits of equal Q value and are made of the same material. It can be shown that if a phase shift minus $\alpha$ is introduced to $f_1$ in amplifier-filter combination 13, the phase shift minus $\alpha$ has to be introduced to $f_2$ in amplifier-filter combination 15 and a phase shift $\alpha$ to $f_3$ in amplifier-filter combination 14.

The filters in amplifier-filter combinations 13 and 15 will drift by the same relative amount when exposed to aging, temperature, humidity or pressure variations. As a result of the drift equal phase increments will be introduced to the frequencies $f_1$ and $f_2$. The frequency $f_3$ will drift in order to compensate these phase increments, but since the phase-frequency characteristic of the crystal filter is very steep, the shift of the frequency $f_3$ will be very small. The shift of $f_3$ will be associated with an equal percential shift of $f_1$ and $f_2$ since $$f_1+f_2=f_3 \quad (1)$$

transposed. Thus the stability of $f_1$ and $f_2$ regarding temperature, humidity, pressure and the like will be comparable to or better than that of a crystal filter. Also power supply variations will be compensated to a large degree since they influence amplifier-filter combinations 13 and 15 equally. $f_1$ and $f_2$ can have any value for which the relationship $$f_3=f_1+f_2 \quad (1)$$

transposed is fulfilled. Tuning the oscillator of Figure 2 is accomplished by decreasing the resonant frequency of amplifier-filter combination 13 and by increasing by an equal amount the resonant frequency of amplifier-filter combination 14, and vice versa. Thus a variable frequency oscillator having the stability of a crystal oscillator is realized.

Referring to Figure 3 where details of the embodiment of Figure 2 are shown, the construction and function will be readily apparent by comparison with Figure 2.

The modulators 1, 2 and 3 may be of the balanced ring diode type of a kind well known in the art, making use of diodes such as are shown at 23, 30 and 34 and precision stable resistors such as are shown at 24, 31 and 35. In one embodiment which has been successfully constructed the diodes used were each "Sylvania" No. 1N40.

The tubes of the amplifier-filter combinations 13, 14 and 15 may be pentodes or double triodes shown at 25*a*, 25*b*, 32*a*, 32*b*, 36*a* and 36*b*, and as successfully used, such tubes were of tube type 12AT7.

The resonant elements of amplifier-filter combination 13 are an inductance denoted by 26 and a fixed or variable capacitance denoted by 27. Capacitance 27 may be the tuning element, as by providing a variable capacitance, or a set of fixed capacitances with provision for alternate switching. Capacitors denoted by 28 and 29 have capacities which are very large as compared with the capacity of capacitance 27.

The resonant element of amplifier-filter combination 14 is the crystal shown at 33, which resonates at a frequency approximating that of $f_3$.

Amplifier-filter combination 15 is very similar to amplifier-filter combination 13 and has a similar inductance denoted by 37, a variable capacitance denoted by 38 and two fixed capacitances denoted by 39 and 40. The resonant frequency here is approximately that of $f_2$ and the capacitances of capacitors 39 and 40 are again very large as compared to that of capacitor 38.

The output amplifier 20 makes use of a simple circuit including the tube shown at 41.

Ordinarily there will be sufficient gain in the system that oscillation will begin automatically but it is a wise precaution to provide means for starting oscillation. For this purpose a push-button switch denoted by 42 is provided for instantaneously connecting and disconnecting modulators 1 and 2 by means of lines denoted by 43 and 44.

Still higher frequency stability can be achieved when an automatic amplitude control circuit is incorporated for the purpose of stabilizing the amplitude of oscillation when power supply voltages vary considerably.

Such an amplitude control circuit rectifies the voltage taken, for example, from the grid of tube 32b and feeds back bias voltage derived by rectification to same or all grids of the amplifier tube used. Conventional circuitry can be used for this purpose. An alternate solution achieving a similar effect incorporates thermistors placed in one or more suitable locations in the circuit.

Another alternative method for achieving a similar effect involves the derivation of the grid bias automatically from the grid current. In such a case the cathodes of all tubes are shorted to ground and the cathode resistors and capacitors are removed.

It will be apparent that the circuit of Figure 1 can be adapted to higher frequencies such as very-high and ultra-high frequencies, in which case appropriate circuit elements for handling such frequencies would be substituted.

Referring to Figure 4 the embodiment of the invention will be described in greater detail as applied to superheterodyne conversion without the use of a local oscillator and where improved intermediate frequency stability can be achieved. Modulators 1, 2 and 3 and amplifier-filter combinations 13, 14 and 15 are shown in Figure 4. There is now no connection between line 82 and modulator 1, and instead an input denoted by 101, similar to input 10 of Figure 1 is provided. An output 17 similar to output 17 in Figure 2 is present.

Frequency $f_3$ is, in the embodiment of Figure 4, applied to modulator 1 on line 101 from an outside source. It will be assumed that a frequency $f_2$ is applied to modulator 1 and to modulator 2. The output frequency $$f_1=f_3-f_2 \qquad (1)$$

of modulator 1 is amplified in amplifier-filter combination 13 and is applied to modulators 2 and 3. The output of modulator 2 contains on line 81, among others, the frequencies $$f_2+f_1=f_3-f_2+f_2=f_3 \qquad (4)$$

and $$f_2-f_1=f_2-f_3+f_2=2f_2-f_3 \qquad (5)$$

The frequency $f_3$ is passed by the filter in amplifier-filter 14 and is mixed with frequency $f_1$ in modulator 3 to produce, among other frequencies, the difference frequency $$f_3-f_1=f_2 \qquad (1)$$

transposed which is being passed by the filter in amplifier-filter combination 15 and applied back to modulators 2 and 1 on lines 7 and 52, respectively.

The frequency $f_2$ will assume such a value that the total phase shift in the loop containing the lines 81, 82, 51, 52 and 7 will be zero.

In other words, if the filter in amplifier-filter combination 14 introduces a phase shift $\alpha$ for the frequency $f_3$ the value of $f_2$ will be such that the filter in amplifier-filter combination 15 introduces a phase shift $-\alpha$. Since $f_3$ is the frequency of the input, variations of $f_3$ will be reflected in a certain manner in the frequency $f_2$.

It will be assumed that the filter in amplifier-filter combinations 14 and 15 have equal but opposite phase-frequency characteristics, for example, one a series and the other a parallel resonance circuit, and have such selectivity value Q that the same absolute frequency deviations introduces equal phase-shifts. Reference is made to Figure 10. In such a case a deviation $$\Delta f_3$$

of the input frequency will cause an equal frequency deviation $$\Delta f_2$$

in the same direction for the frequency $f_2$. The difference frequency $$f_3-f_2=f_1 \qquad (1)$$

transposed will thus not be influenced by the variations of the input frequency $f_3$.

It will now be assumed that the filter in amplifier-filter combination 14 and the filter in amplifier-filter combination 15 have equal Q values and equal but opposite phase characteristics, as well as being similarly constructed of the same material. In this case a drift of the filters in amplifier-filter combinations 14 and 15 will cause equal but opposite phase shifts in both filters without changing the total phase shift for the same frequencies, as is shown in Figure 10. As a result, the frequency $f_2$ will not change.

The conditions imposed on the Q values of the filters in the two above cases can be nearly fulfilled at the same time if $f_3$ and $f_2$ are relatively close together. For example, this would be the case when $f_3$ and $f_2$ are both ultra-high frequencies or super-high frequencies separated by the amount of the intermediate frequency. Then the two properties listed below would be fulfilled at the same time:

(1) The intermediate frequency will not be influenced by the variations of the input frequency $f_3$;

(2) The intermediate frequency will not be influenced by the drifts of the filters in amplifier-filter combinations 14 and 15 which determine the value of $f_2$ (the substitute for the local oscillator frequency).

Referring to Figure 5 an embodiment of the present invention is shown as applied to superheterodyne conversion without the use of a local oscillator where the output frequency does not reproduce variations of the input frequency. The modulators 1, 2 and 3 are again present and likewise amplifier-filter combinations 13 and 15, but amplifier-filter combinations 14 of Figure 4 is absent. This omission is preferred in the present embodiment but it should be pointed out that a broad-band amplifier unit may be used between modulators 2 and 3.

Two additional elements are present in the embodiment shown in Figure 5, an amplitude limiter or filter denoted by 46, inserted at the output of amplifier-filter combination 15 and connected thereto by line denoted by 53 and also connected to line 52 by a line denoted by 54. A similar amplitude limiter or filter combination, denoted by 47 is connected in the path between line 62 and modulator 3, denoted by lines 91 and 92.

Referring to the function of a converter system of Figure 4 it will be evident that due to the removal of the filter unit in the amplifier-filter combination 14, no phase shift will be introduced to the frequency $f_3$ in line 8 and therefore the frequency $f_2$ will be only determined by the filter of amplifier-filter combination 15 and thus not influenced by variations of the input frequency $f_3$. Accordingly, if the output is taken on line 45, its frequency stability will be only dependent on the stability of the filter in amplifier-filter combination 15.

The amplitude limiters or filters 46 and 47 are designed to remove carrier amplitude modulation before the carriers are fed back to modulators 1, 2, and 3.

If $f_2$ and $f_3$ are much larger than $f_1$, the present embodiment is suitable as a radio link system having output frequency independent of the input frequency.

A modification of the embodiment just described is shown in Figure 6. In addition to the elements shown in Figure 5, a detector denoted by 48 and an audio or video amplifier denoted by 49 is inserted in the output line 45. In this embodiment the output frequency $f_2$ is chosen so as to be the lowest in the system and is equivalent to the intermediate frequency. Amplifier-filter combination 15 is an intermediate-frequency amplifier and amplifier 13 a radio-frequency amplifier operating at a frequency higher than the intermediate frequency. In the detector 48, the information is separated from the intermediate-frequency and amplified in audio or video amplifier 49. The embodiment of Figure 6 is suitable as a receiver where it is desired that the intermediate frequency be not influenced by the input frequency variations.

Another type of converter will be explained with reference to Figure 7. In addition to the elements shown in Figure 5, output amplifier 49 is placed in the output line denoted by 451 which is connected to line 8 from which either the frequency $f_3$, or $2f_2-f_3$ can be taken for the output. These frequencies will follow the changes of the input frequency. The power level in line 8 will be higher than at the input so that the system can be considered as a combined amplifier and converter. Attention is directed to the special case of operation when the center frequencies of the filters in amplifier-filter combinations 13 and 15 are chosen to be in approximately rational relationships to each other.

In such a case the locking effect will cause the frequencies of the oscillation which will be maintained to shift so as to establish a fixed rational relationship. Operation for frequency ratios of 50:1 or 1:50 or higher, between $f_3$ and $f_2$ or between $f_3$ and $f_1$ can be achieved. The greatest locking range can be obtained when the phase frequency characteristics of the filters in amplifier-filter combinations 13 and 15 are so designed that $$\frac{d\theta}{dw}$$

is minimum where $\theta$ is the phase shift introduced by the filter and $w$ as usual is $2\pi$ times the frequency. It will be seen that if $f_2$ or $f_1$ are multiples of $f_3$, the system can act as a frequency multiplier and when $f_2$ and $f_1$ are submultiples of $f_3$, the system can act as a frequency divider. If $f_1$ or $f_2$ bear any rational relationship to $f_{-3}$, the system can act as a converter providing a fixed rational relationship between the input and output frequencies.

A frequency divider can be applied as a radio link under circumstances where the intermediate frequency is equal to $$\frac{f_3}{n}$$

where $n$ is the division ratio. The relative stability of the output and the intermediate frequency will be the same as that of the input carrier and there will be an improvement in the absolute stability of the intermediate frequency by a factor equal to the division ration $n$.

A modification of the embodiment of Figure 7 is shown in Figure 8. The output is taken at the intermediate frequency and a detector 48 and audio or video amplifier 49 are provided in the output line 16. The advantages of a fixed relationship between the input and the intermediate frequency described above are retained in the embodiment of Figure 8 and thus a superheterodyne receiver for receiving fixed frequencies is provided.

The performance characteristics common to all the converter systems referred to above with reference to Figures 4–8 will now be described. When a signal is applied to the systems of Figures 4–8 any sudden disturbance like tube noise or an artificially-applied voltage transient will be sufficient to make the frequencies inherent in the system exist.

It was noted in connection with the oscillator adaptation of the present invention that a similar condition there exists as well. In the present embodiment self-starting can be accomplished either by applying artificial disturbance or when the gain of the amplifiers is larger than the gain required in the steady state. Thus at a certain input level the system will start to operate.

Figure 11 shows the approximate relationship between the output and input voltage of the system. It is observed that a linear relationship exists after a small region of non-linearity caused by the non-linear characteristic of the mixer. This amplitude response characteristic of the system may be utilized in amplitude discrimination, and the starting input voltage level, denoted by point A may be controlled electrically, since it is a function of the gain in the amplifiers.

Referring to Figure 12, it will be seen that as the input frequency moves away from its center value, the gain in the loops containing the filters decreases and at certain values of the input frequency on both sides of the center values, the loop gain decreases below unity, and the operation of the system stops. Thus the system has a characteristic of improved selectivity, and has filter-like properties.

The circuit elements shown in block diagram form in the various figures are all of conventional construction and follow the design practice in the corresponding frequency ranges.

The modulators are preferably of the balanced type, being ring modulators for the lower frequencies, and for microwave frequencies may be of the type described in the Bell System Technical Journal, April 1948, H. J. Foiis, "Microwave Repeater Research." Mixers combined with amplifiers are now commercially available, for example from the Sperry Gyroscope Company. Such devices are particularly suitable for the modulators 2 or 3 for use at microwave frequencies.

It will be seen that the invention herein described shows the development of the basic circuit of Figure 1 for a large number of specific uses which have considerable importance and attractive commercial possibilities.

I claim:

1. An electrical circuit comprising three modulators a first, second and third modulator, each having two inputs and one output, the output of the first modulator being connected to one input of the second modulator and to one input of the third modulator, the output of the second modulator being connected to one input of the third modulator, the output of the third modulator being connected to one input of the first modulator and to the second input of the second modulator.

2. An electrical oscillation device according to claim 1 wherein the output of the second modulator is connected to the second input of the first modulator, permitting the device to function as an oscillator.

3. An electrical conversion device according to claim 1 wherein the second input of the first modulator has a lead capable of being connected to an external source of radio-frequency energy, permitting the device to function as a converter.

4. An electrical oscillation device according to claim 1 wherein the output of the second modulator is connected to the second input of the first modulator permitting the device to function as an oscillator, and wherein there is in addition amplifier-filter means in cascade with the output of at least one modulator.

5. An electrical conversion device according to claim 1 wherein the output of each modulator is connected as defined therein, and there is in addition amplifier-filter means in cascade with the output of at least one modulator, and wherein the second input of the first modulator has a lead capable of being connected to an external source of radio-frequency energy, permitting the device of function as a converter.

References Cited in the file of this patent

UNITED STATES PATENTS

| | | |
|---|---|---|
| 2,180,816 | Miller | Nov. 21, 1939 |
| 2,276,863 | Peterson | Mar. 17, 1942 |
| 2,344,678 | Crosby | Mar. 21, 1944 |
| 2,534,606 | Kolster | Dec. 19, 1950 |